United States Patent
Ollier et al.

(10) Patent No.: US 10,054,489 B2
(45) Date of Patent: Aug. 21, 2018

(54) INFRARED RADIATION EMISSION SURFACE HAVING A HIGH THERMAL EMISSIVITY AND A LONG LIFE TIME AND ITS MANUFACTURING METHOD

(71) Applicant: COMMISSARIAT A L'ENERGIE ATOMIQUE ET AUX ENERGIES ALTERNATIVES, Paris (FR)

(72) Inventors: Emmanuel Ollier, Grenoble (FR); Nicolas Dunoyer, Grenoble (FR)

(73) Assignee: COMMISSARIAT A L'ENERGIE ATOMIQUE AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/694,699

(22) Filed: Sep. 1, 2017

(65) Prior Publication Data
US 2018/0066993 A1 Mar. 8, 2018

(30) Foreign Application Priority Data
Sep. 5, 2016 (FR) ..................... 16 58240

(51) Int. Cl.
*G01J 5/04* (2006.01)
*G01J 5/00* (2006.01)

(52) U.S. Cl.
CPC ............. *G01J 5/048* (2013.01); *G01J 5/0014* (2013.01)

(58) Field of Classification Search
CPC .......... G01J 5/048; G01J 5/0014; H01K 1/04; H01K 1/14; H02S 10/30; Y02E 10/50
See application file for complete search history.

(56) References Cited

U.S. PATENT DOCUMENTS

| 4,396,643 A | 8/1983 | Kuehn et al. |
| 6,031,970 A | 2/2000 | Nordal et al. |

(Continued)

FOREIGN PATENT DOCUMENTS

| DE | 198 45 423 A1 | 4/2000 | |
| DE | 19845423 A1 * | 4/2000 | ............... H01K 1/14 |
| EP | 2 966 773 A1 | 1/2016 | |

(Continued)

OTHER PUBLICATIONS

Hideki Miyazaki et al., "Ultraviolet-nanoimprinted packaged metasurface thermal emitters for infrared CO2 sensing," Science and Technology of Advanced Materials, vol. 16, 2015, 035005.

(Continued)

*Primary Examiner* — David E Smith
(74) *Attorney, Agent, or Firm* — Baker & Hostetler LLP

(57) ABSTRACT

An infrared IR radiation emission surface in a predetermined wavelength range comprises a substrate made of a material based on silicon carbide SiC, and an ensemble of texturing microstructures covering the exposed emission face of the substrate. Each microstructure is formed by a single protuberance, which is arranged on and integrally with the substrate. The microstructures have the same shape and the same dimensions, and are distributed over the face of the substrate in a bidimensional periodic pattern. The shape of each microstructure is smooth and regular, with a radius of curvature which varies continuously from the apex of the microstructure to the exposed emission face of the substrate.

20 Claims, 10 Drawing Sheets

(56) References Cited

U.S. PATENT DOCUMENTS

2006/0076868 A1    4/2006  Pullini et al.
2009/0127478 A1*   5/2009  Inoue .................... G01J 3/108
                                                    250/504 R

FOREIGN PATENT DOCUMENTS

| EP | 2966773 A1 * | 1/2016 | ........... H01L 31/054 |
| FR | 3 014 177 A1 | 6/2015 | |
| JP | 2015-027207 A | 2/2015 | |
| JP | 2015027207 A * | 2/2015 | |

OTHER PUBLICATIONS

A.Y. Vorobyev et al., "Colorizing metals with femtosecond laser pulses," Applied Physics Letters, vol. 92, 2008, 041914.

L. Müller et al., "Infrared emitting nanostructures for highly efficient microhotplates," Journal of Micromechanics and Microengineering, vol. 24, 2014, 035014.

T. Inoue et al., "Filter-free nondispersive infrared sensing using narrow-bandwidth mid-infrared thermal emitters," Applied Physics Express, vol. 7, 2014, 012103.

* cited by examiner

INFRARED RADIATION EMISSION SURFACE HAVING A HIGH THERMAL EMISSIVITY AND A LONG LIFE TIME AND ITS MANUFACTURING METHOD

CROSS-REFERENCE TO RELATED APPLICATIONS

This application claims priority to foreign French patent application No. FR 1658240, filed on Sep. 5, 2016, the disclosure of which is incorporated by reference in its entirety.

FIELD OF THE INVENTION

The present invention relates to an infrared IR radiation emission surface in a predetermined wavelength range, and to a method for its manufacture.

The present invention relates more particularly to an IR emission surface which is produced by texturing on a material and is resistant to an oxidizing medium such as air and/or to high temperatures.

The present invention also relates to an infrared IR radiation emitter with high emissivity, the emission surface of which has been ordered to emit strong thermal radiation in the same wavelength range as that corresponding to a reduction of the reflectivity, or an increase in the absorption of the said surface.

BACKGROUND

Specifically, according to Kirchhoff's law for an opaque material, a surface rendered highly absorbent in a predetermined wavelength range by its structuring is also a surface capable of efficiently emitting thermal radiation in the same wavelength range. Because of its optical properties, such a surface is made capable of emitting infrared IR radiation with a spectrum different from that of a black body, while promoting emission in wavelengths close to the structuring dimensions.

It is known that highly absorbent structures are also structures which make it possible to efficiently emit thermal radiation at the same wavelengths according to Kirchhoff's law for an opaque body.

These structures are therefore of great interest particularly in the near infrared range, for forming good thermal IR sources. This type of source may, for example, be used for IR gas sensors. In this case, a material constituting the IR source is heated to high temperature (several hundreds of degrees), and it emits its IR radiation which passes through a region comprising a material, such as a gas, the composition of which is desired to be known. This material generally absorbs the infrared IR radiation in a precise wavelength range, and an infrared IR detector therefore makes it possible to record the transmitted radiation. The desired concentration of material (generally a gas) can then be deduced. Sources emitting in the range of from 1 to 5 microns make it possible, for example, to detect carbon dioxide $CO_2$, carbon monoxide CO, as well as volatile hydrocarbons.

In the particular example of the source of a gaseous carbon dioxide $CO_2$ sensor, this gas absorbs particularly in the range 4-4.5 microns. This is the band generally desired for analysis of this gas.

The materials generally used for infrared IR emission are as follows: so-called "black" metals such as platinum, gold and aluminium which are rendered black by their porous deposition structure, surface structures obtained by a femtosecond laser, carbon nanotubes, textured silicon coated with metal.

The structures of surfaces obtained by a femtosecond laser are described, for example, in the article by A. Y. Vorobyev entitled "Colorizing metals with femtosecond laser pulses", published in Applied Physics Letters 92, 041914 (2008).

Textured silicon coated with metal is described, for example, in the article by L. Müller et al. entitled "Infrared emitting nanostructures for highly efficient microhotplates", published in Journal of Micromechanics and Microengineering, 24(2014) 035014.

More recent techniques are now seeking selective emission in terms of spectra for the fields of thermophotovoltaics, hyperspectral analysis, and filter-free NDIR sensors. According to these techniques, surfaces functionalized with quantum wells now allow laboratory production of sources whose radiation can be controlled in terms of wavelength and emission in a narrow wavelength band.

One example of these surface structures is described, for example, in the article by T. Inoue et al. entitled "Filter-free nondispersive infrared sensing using narrow-bandwidth mid-infrared thermal emitters", published in Applied Physics Express, 7, 012103 (2014). These structures, however, are expensive to produce, with technical steps of the electron-beam lithography type. Furthermore, they are intended to be integrated into evacuated housings, which increases the complexity.

In terms of materials, the stacks often comprise alternations of dielectric and metallic materials (stacks of the Salisbury type, using quarter-wave layers) which make it possible to increase the absorption and therefore the emission in a precise wavelength range. These stacks have the drawback of being relatively thick, and of comprising metals which are generally sensitive to oxidation at high temperature. Photonic crystals have also been proposed. Lastly, plasmonics has made it possible to propose resonant metal structures, although their metals remain sensitive to oxidation at high temperature.

MIM (metal/insulator/metal) structures have also been developed, because they make it possible to tune an absorption/emission line relatively easily, and could make it possible to combine spectral and angular selectivity. An example of an MIM structure is described in the article by H. T. Miyazaki entitled "Ultraviolet-nanoimprinted packaged metasurface thermal emitters for infrared $CO_2$ sensing", published in Science and Technology of Advanced Materials, No 16, (2015) 035005.

These structures, on the other hand, still have the drawback of comprising metals which may be sensitive to oxidation when the structures are heated in air, or generally in a weak vacuum.

Despite interesting advances, particularly in the selective emission of structures constituting IR sources for gas sensors, there are still those which, as thermal sources, need to be heated to several hundreds of degrees Celsius in order to emit their infrared IR radiation. These structures often comprise metals, all of which are more or less sensitive to oxidation in the long or short term, or to inter-diffusion of the layers used. Evacuation of emitting sources, which is often recommended for reasons of reducing the losses of heat or of stability of the materials, is still not a solution which is easy to implement, and is relatively expensive. If use in air or a weak vacuum is implemented, the existing solutions will be limited by oxidation of the structures. Furthermore, even without an oxidizing medium, the quality of the optical interfaces created may be affected by the diffusion of elements under the effect of temperature, making the emission characteristics of the IR sources unstable over time.

It is this technical problem of temperature stability, particularly in an oxidizing medium, which the present invention resolves.

SUMMARY OF THE INVENTION

To this end, the invention relates to an infrared IR radiation emission surface with high thermal emissivity for an infrared radiation emitter, comprising a substrate consisting of a thickness of a first material based on silicon carbide SiC and having a planar or curved face, and an ensemble of texturing microstructures covering the face. The infrared IR radiation emission surface is characterized in that each microstructure is formed by a single protuberance made of the first material, which is arranged on and integrally with the substrate, and the microstructures have the same shape and the same dimensions, and are distributed over the face of the substrate in a bidimensional periodic pattern, and the shape of each microstructure is smooth and regular, while having a single apex and a radius of curvature which varies continuously from the apex of the microstructure to the face of the substrate.

According to particular embodiments, the infrared IR radiation emission surface comprises one or more of the following characteristics:

the first material based on silicon carbide is monocrystalline or polycrystalline silicon carbide SiC, or monocrystalline or polycrystalline silicon carbide SiC enriched with silicon Si in the form of silicon islands Si;

the surface of each microstructure has an apex lying in a central region with the same maximum height h, corresponding to the height of the microstructure, and the said surface of the microstructure decreases from the apex towards an edge of a base of the microstructure;

the surface of each microstructure comprises a part of the surface of a spherical, elliptical or parabolic cap;

each microstructure substantially has the same base diameter d, which is greater than or equal to 0.5 µm and less than or equal to 7 µm, preferably lying between 1 µm and 5 µm, and the same maximum height h of each microstructure is greater than or equal to 0.5 times the base diameter d and less than or equal to 10 times the base diameter d;

the radius of curvature p of each microstructure is greater than or equal to 0.1 µm and distributed around a central radius of curvature value of between 0.5 µm and 5 µm;

the arrangement of the microstructures on the exposure face of the substrate is carried out in the form of tiling of elementary networks of microstructures, the elementary networks having the same cell pattern among the group formed by hexagonal cells, square cells and triangular cells, and being characterized by a degree of compactness of the microstructures with respect to one another;

the surface of each microstructure and the face of the substrate are oxidized.

The invention also relates to an infrared IR radiation emitter comprising an infrared IR radiation emission surface as defined above.

According to particular embodiments, the infrared IR radiation emitter comprises one or more of the following characteristics:

the infrared IR radiation emitter is among the group of devices formed by infrared heating sources, emitters of infrared IR to a thermophotovoltaic cell for converting heat into electricity, and emitters of an infrared IR source for gas sensors.

The invention also relates to a method for manufacturing an infrared IR radiation emission surface capable of operating at high temperatures, the said manufacturing method comprising a first step consisting in providing a substrate, consisting of a thickness of a first material based on silicon carbide SiC and having a planar or curved exposure face. The manufacturing method is characterized in that it furthermore comprises a second step, carried out following the first step, consisting in producing an ensemble of texturing microstructures covering the face, each microstructure being formed by a single protuberance made of the first material and arranged on and integrally with the substrate, the microstructures having the same shape and the same dimensions, and being distributed over the face of the substrate in a bidimensional periodic pattern, and the shape of each microstructure being smooth and regular, while having a single apex and a radius of curvature which varies continuously from the apex of the microstructure to the face.

According to particular embodiments, the method for manufacturing a selective infrared IR radiation emission surface comprises one or more of the following characteristics:

the first step consists: either in providing monocrystalline or polycrystalline silicon carbide SiC, or in providing monocrystalline or polycrystalline silicon carbide SiC enriched with silicon in the form of silicon islands Si;

the first step consists: either in isostatically compressing a silicon carbide SIC powder, or in growing polycrystalline silicon carbide SIC, or in growing monocrystalline silicon carbide SIC, or in infiltrating silicon Si at high temperature into a porous carbon-containing matrix;

the second step comprises the successive steps consisting in, in a third step, depositing a compact monolayer of particles of a second material on the surface of the substrate, and in a fourth step, etching the substrate by a dry etching method on the exposure face side through interstices existing between the particles, the second material being included in the group formed by silica ($SiO_2$), polystyrene (PS) or any other colloidal material in the form of beads with the required dimension;

reduction of the size and the shape of the particles by dry etching is carried out, either in a fifth step carried out during the fourth step at the same time as the dry etching of the substrate, or in a sixth step interposed between the third step and the fourth step;

the deposition of the compact film of particles carried out during the third step is performed either by a deposition technique involving an air/liquid interface ordering the particles, among the group formed by the Langmuir-Blodgett technique, the Langmuir-Shaefer technique, the surface vortex method, the flotation transfer technique, the technique of fine dynamic and mobile laminar flow, or by a deposition technique involving only particles in colloidal solution, among the group formed by electrophoretic deposition, horizontal deposition by evaporation of a film, deposition by evaporating of a bath, deposition by vertical removal of an immersed substrate, and horizontal deposition by forced removal of the contact line;

the dry etching method carried out in the fourth step is reactive ion etching using a gas mixture of sulfur hexafluoride ($SF_6$) and dioxygen ($O_2$) in a ratio of 5/3;

the etching rate Vsub of the substrate material and the etching rate Vpar of the particles, the etching selectivity Sg, defined as the ratio of the etching rate of the substrate to the etching rate of the particles, and the etching time are regulated so as to consume all of the particles and avoid the creation of sharp edges on the surface of the substrate;

the method of manufacturing comprises a seventh step for removing the particles, which is carried out after the fourth step;

the method for manufacturing an infrared IR radiation emission surface comprises an eighth step of oxidizing the surface of the microstructures and the face of the substrate.

BRIEF DESCRIPTION OF THE DRAWINGS

The invention will be understood better on reading the following description of several embodiments, which is given solely by way of example and is provided with reference to the drawings, in which.

DETAILED DESCRIPTION

The invention relates to the use of structured materials based on silicon carbide SiC for selective infrared IR radiation emission surfaces, the materials based on silicon carbide providing a high resistance to oxidation at high temperatures which exceed 500° C., or even 1000° C.

The invention also relates to the geometry of the structuring of the materials based on silicon carbide and to its methods for obtaining these structurings, which make it possible to increase in a predetermined wavelength range the absorption of the radiation and the thermal emission of infrared radiation in a given wavelength range, and to increase the resistance of this optical performance at high temperature and in an aggressive medium, for example an oxidizing medium, such as air.

The increase in the IR power radiated when the material is heated to a relatively high temperature, from a few hundreds of degrees Celsius to more than 1000° C., is thus obtained by increasing the absorption and therefore by reducing the reflectivity of the opaque materials based on silicon carbide which constitute the emission surface.

For example, an emission surface and the method for manufacturing it are particularly suitable for that of an infrared IR emitter for detecting carbon dioxide $CO_2$ in a wavelength range extending from 4 to 4.5 microns.

Figure 1:
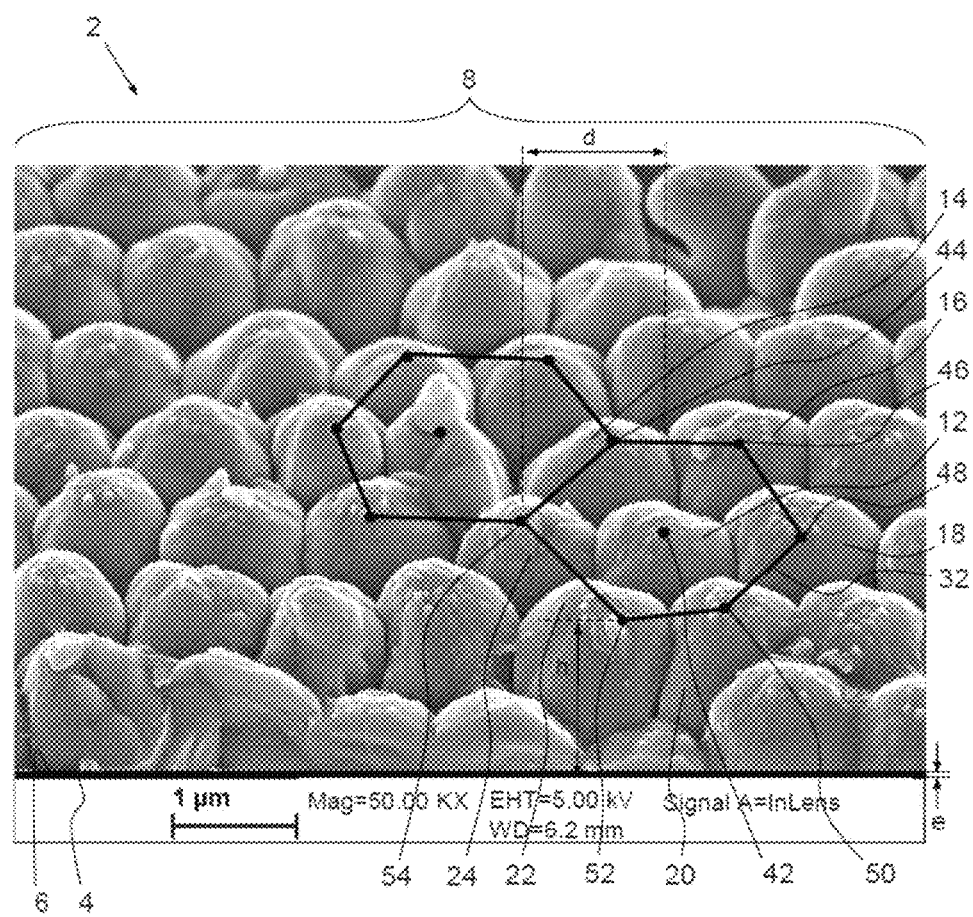
FIG. 1 is a scanning electron microscopy view of a first embodiment of an infrared IR radiation emission surface with high thermal emissivity, microstructured and made of polycrystalline silicon carbide SiC, according to the invention which is obtained by plasma etching through a mask of self-organized beads with a diameter of 1 micron (μm)

According to FIG. 1, an infrared IR radiation emission surface 2 in a predetermined infrared wavelength range, with high absorption in the visible and near infrared range and with high thermal emissivity, in particular for infrared IR radiation emitters which is capable of operating at high temperatures, comprises a substrate 4 consisting of a thickness e of a first material based on silicon carbide SiC and having a planar or curved emission face 6.

The first material based on silicon carbide is in this case a material made of silicon carbide of a first type, consisting of polycrystalline silicon carbide SiC.

The infrared radiation emission surface 2 also comprises an ensemble or a set 8 of texturing microstructures 12, 14, 16, 18, 20, 22, 24 covering the exposed emission face 6 of the substrate 4.

Here, only seven texturing microstructures 12, 14, 16, 18, 20, 22, 24 have been denoted by a numerical reference for the sake of simplicity of the description.

Each texturing microstructure 12, 14, 16, 18, 20, 22, 24 is formed by a single protuberance made of the first material, which is arranged on and integrally with the substrate 4.

The microstructures 12, 14, 16, 18, 20, 22, 24 have the same shape and the same dimensions; they extend at least locally parallel to one another along a local direction, which is perpendicular to the exposed emission face 6 at the location of each microstructure 12, 14, 16, 18, 20, 22, 24.

The microstructures 12, 14, 16, 18, 20, 22, 24 are distributed over the exposed emission face 6 of the substrate 4 in a bidimensional periodic pattern 32. Here, the shape of the bidimensional periodic pattern 32 is, for example, hexagonal close-packed.

The shape of each microstructure 12, 14, 16, 18, 20, 22, 24 is smooth and regular, while having a single apex 42, 44, 46, 48, 50, 52, 54 and a radius of curvature which varies continuously from the apex of the microstructure 12, 14, 16, 18, 20, 22, 24 to the exposed emission face 6 of the substrate 4.

Figure 2:
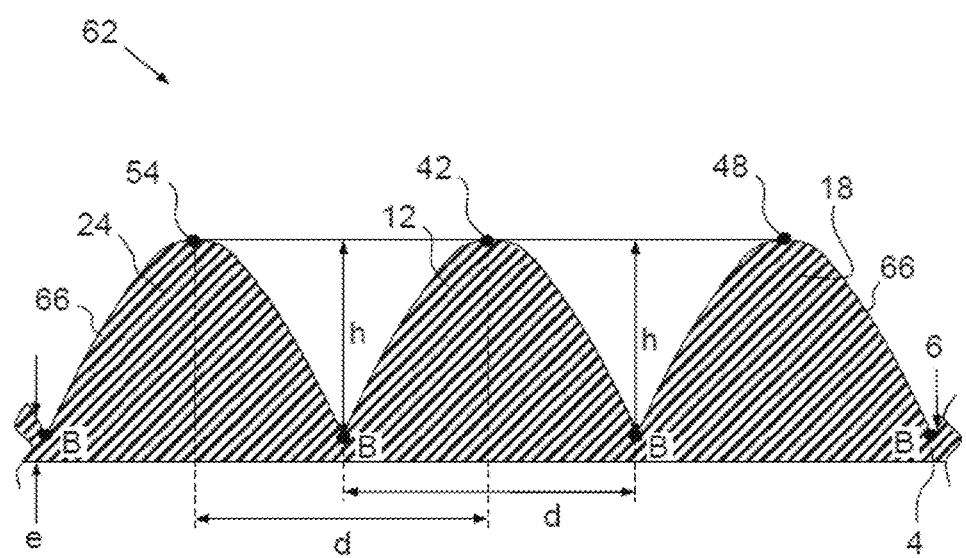
FIG. 2 is a view in section in the direction of their height, and passing through their apices, of three adjacent microstructures of the infrared IR radiation emission surface of FIG. 1.

According to FIG. 2, a partial section profile 62 of the ensemble 8 of the microstructures, here the three microstructures 24, 12, 18 which are aligned and adjacent to one another, and of the support substrate 4, comprises a continuous contour line 66 of the emission surface 6.

According to FIGS. 1 and 2, the surface of each microstructure 12, 14, 16, 18, 20, 22, 24 has the same maximum height h, which lies in a central zone around its apex and corresponds to the height of the microstructure 12, 14, 16, 18, 20, 22, 24, and decreases from its apex to an edge B of a base of the microstructure 12, 14, 16, 18, 20, 22, 24.

The texturing microstructures 12, 14, 16, 18, 20, 22, 24 are obtained in this example by plasma etching through a mask of self-organized balls having a diameter equal to 1 micron. The diameter d of a microstructure respectively lying below each ball is in this case correspondingly about 1 micrometer, and the top of the shape of each microstructure 12, 14, 16, 18, 20, 22, 24 may be described here by a hemisphere or rounded cone, or the apex of a parabola.

Here, and preferably, all the adjacent microstructures are joined by their edges at the exposure face, and their junction surface has a point or a line with discontinuous curvature.

As a variant, the adjacent microstructures are not joined by their edges at the exposure face, and the junction curve of each microstructure with the exposure face presents a line of discontinuous curvature.

As a variant, the adjacent microstructures are not joined by their edges at the exposure face, and the curvature is continuous on a vicinity of the junction curve of each microstructure with the exposure face.

Diameters of 0.5 micron may be used, and produce an optical performance similar in the visible range to that obtained with a diameter of 1 micron, but different in the infrared range. The arrangement of the microstructures 12, 14, 16, 18, 20, 22, 24 in the local plane of the structured surface is periodic in the manner of the arrangement of the covering of balls which is used, the periodic pattern of the arrangement preferably being hexagonal close-packed, although it could be different.

According to FIG. 1, which is a perspective view from above of the emission surface 2, it can be seen clearly that the bidimensional periodic pattern 32 is hexagonal close-packed, and that the network of microstructures which is formed in this way is a compact network with a hexagonal cell.

Figure 3:
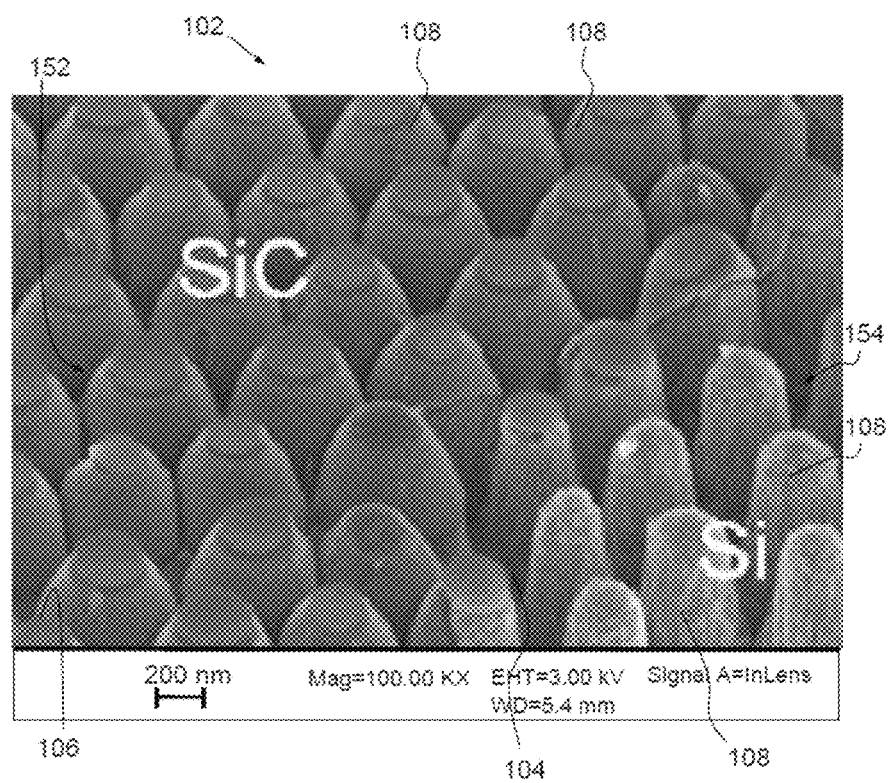
FIG. 3 is a scanning electron microscopy view of a second embodiment of an infrared IR radiation emission surface with high thermal emissivity, microstructured and made of polycrystalline silicon-enriched silicon carbide SiSiC, according to the invention, which is obtained by plasma etching through a mask of self-organized beads with a diameter of 0.5 micron (μm)

According to FIG. 3 and a second embodiment of the invention a surface 102 for infrared emission in a predetermined infrared wavelength range is structured and constructed in this case from a material based on silicon carbide of second type SiSiC, which, in the manner of the antireflection surface of FIG. 2, comprises silicon carbide SiC, which is however enriched with silicon Si by having islands of silicon Si. This second type of material SiSiC is, for example, obtained by forming a porous carbon-containing material by means of pyrolysis, then infiltration of a silicon precursor is carried out at high temperature in order to form the composite of silicon carbide SiSiC. In the case of this second type of material, the structure obtained is similar to that obtained for the silicon carbide SiC of the material of the first type in FIG. 1, and results in a hexagonal close-packed arrangement of structures which may be described by a shape of parabolic domes or rounded cones, or hemispheres, the diameter of which is in this case 0.5 micron.

Here, in FIG. 3, two zones of the material of the substrate 104 and of the microstructures 108 lying on the exposure face 106 of the substrate 104 are represented partially. A first zone 152 of silicon carbide SiC is illustrated in the upper-left corner of FIG. 3, and a second zone 154 of silicon Si is illustrated in the lower-right corner of FIG. 3, which second zone 154 forms an island of silicon Si of the substrate 104.

It should be noted that the residues of silica balls which can be seen on the top of some microstructures 108 do not form part of the said microstructures, and that these residues of balls will have disappeared at the end of the manufacturing process because of consumption by the etching method.

In general, an infrared radiation emission surface according to the invention, with high thermal emissivity, in particular for infrared IR radiation emitters, capable of operating at high temperatures, comprises a substrate consisting of a thickness of a first material based on silicon carbide SiC and having a planar or curved emission face, and an ensemble of texturing microstructures covering the face of the said substrate.

Each microstructure is formed by a single protuberance made of the first material, which is arranged on and integrally with the substrate. The microstructures have the same shape and the same dimensions, and they are distributed over the exposed emission face of the substrate in a bidimensional periodic pattern, and the shape of each microstructure is smooth and regular, while having a single apex and a radius of curvature which varies continuously from the apex of the microstructure to the exposed emission face of the substrate.

The first material based on silicon carbide is among the group formed by monocrystalline silicon carbide SiC, polycrystalline silicon carbide, and monocrystalline or polycrystalline silicon carbide SiC enriched with silicon in the form of silicon islands Si.

In particular, the surface of each microstructure comprises a part of the surface of a spherical, elliptical or parabolic cap.

In general and independently of the embodiment of the selective infrared radiation emission surface, each microstructure has substantially the same base diameter d, which is greater than or equal to 0.3 µm and less than or equal to 10 µm, preferably lying between 1 µm and 5 µm, and the same maximum height h of each microstructure is greater than or equal to 0.5 times the base diameter d and less than or equal to 10 times the base diameter d.

The radius of curvature p of each microstructure is greater than or equal to 0.1 µm and distributed around a central radius of curvature value $\rho_0$ of between 0.5 µm and 5 µm.

In general, the arrangement of the microstructures on the exposed emission face of the substrate is carried out in the form of tiling of elementary networks of microstructures, the elementary networks having the same cell pattern among the group formed by hexagonal cells, square cells and triangular cells, and being characterized by a degree of compactness of the microstructures with respect to one another.

In particular, the surface of each microstructure and the face of the substrate are oxidized.

Figure 4:
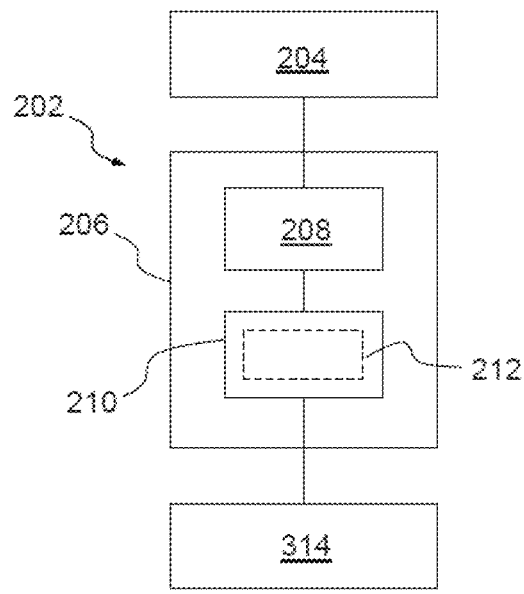
FIG. 4 is a general flowchart of a first embodiment of a method for manufacturing a textured infrared radiation emission surface such as that of FIGS. 1 to 3.

According to FIG. 4 and a first embodiment, a method 202 for manufacturing the texturing of the infrared radiation emission surfaces as described, for example, in FIGS. 1 to 3 comprises a set of steps 204, 206, 208, 210, 212.

This method is suitable in particular for manufacturing an emitter of infrared IR radiation in a predetermined wavelength range the textured surface manufactured being capable of operating at high temperatures and/or in an oxidizing environment, for example air.

In a first step 204, a substrate is provided, consisting of a thickness of a first material based on silicon carbide SiC, which is thermally stable, and having a planar or curved emission face.

In a second step 206, which is carried out following the first step 204, an ensemble of texturing microstructures covering the face of the substrate is produced.

Each microstructure is formed by a single protuberance made of the first material, which is arranged on and integrally with the substrate.

The microstructures have the same shape and the same dimensions, and they are distributed over the exposed emission face of the substrate in a bidimensional periodic pattern.

The shape of each microstructure is smooth and regular, while having a single apex and a radius of curvature which varies continuously from the apex of the microstructure to the exposed emission face of the substrate.

The first step 204 consists:

either in providing monocrystalline or polycrystalline silicon carbide SiC, or in providing monocrystalline or polycrystalline silicon carbide SiC enriched with silicon in the form of silicon islands Si.

In particular, the first step, 204 consists:

either in isostatically compressing a powder of silicon carbide SiC, or in growing polycrystalline silicon carbide SiC, or in growing monocrystalline silicon carbide SiC, or in infiltrating silicon Si at high temperature into a porous carbon-containing matrix.

The second step 206 comprises a third step 208 and a fourth step 210, which are carried out successively.

In the third step 208, a compact monolayer of masking particles made of a second material is deposited on the surface of the substrate, the second material being included in the group formed by silica ($SiO_2$), polystyrene (PS) or any other colloidal material in the form of balls with the required dimension.

In the fourth step 210, the substrate is etched by a dry etching method on the exposure face side through interstices existing between the particles.

During the fourth step 210, that is to say at the same time as the dry etching of the substrate, in a fifth step 212 reduction of the size and the shape of the particles by dry etching is carried out.

Figure 5:
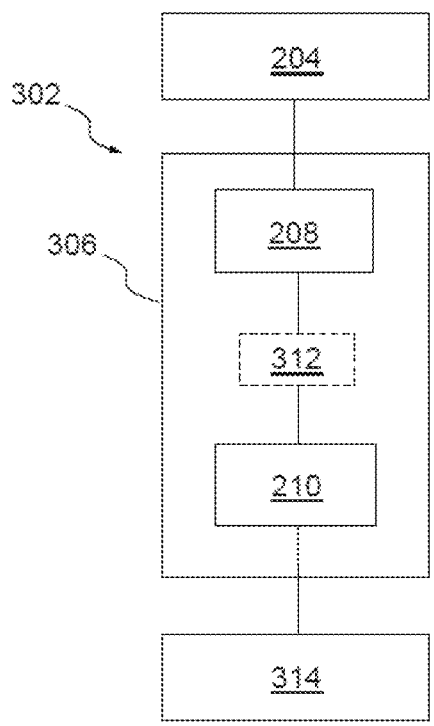
FIG. 5 is a flowchart of a second embodiment of a method for manufacturing a textured infrared radiation emission surface such as that of FIGS. 1 to 3.

According to FIG. 5 and a second embodiment, derived from the first embodiment, a method 302 for manufacturing a textured selective infrared radiation emission surface, for example for emitters of infrared radiation in a predetermined wavelength range, and as described for example in FIGS. 1 to 3, comprises a set of steps 204, 306, 208, 210, 312.

The first step 204 of the method 302 of FIG. 5 is identical to the first step of the method 202 of FIG. 4.

The second step 306 of the method 302 of FIG. 5 comprises, in the manner of the method 202 of FIG. 4, the third step 208 and the fourth step 210.

The second step 306 of the method 302 of FIG. 5 differs from the method 202 of FIG. 4 in that it comprises a sixth step 312, interposed between the third step 208 and the fourth step 210, in which reduction of the size and the shape of the particles by dry etching is carried out without interaction with the dry etching of the substrate.

In FIGS. 4 and 5, the manufacturing methods 202 302 comprise a seventh step 314 of removing the particles, which is carried out after the fourth step 210. For example, the seventh step 314 consists in cleaning the textured surface by immersing it in a bath of ethanol in the presence of ultrasound for at least five minutes.

According to FIGS. 4 and 5, the deposition of the compact film of particles carried out during the third step 208 is performed either by a deposition technique of a first family involving an air/liquid interface for ordering the particles, or by a deposition technique of a second family involving only particles in colloidal solution.

The first family of techniques of depositing particles in a compact film is the group formed by the method of transferring a monofilm of compacted particles onto a carrier liquid in movement, the Langmuir-Blodgett technique, the Langmuir-Shaefer technique, the surface vortex method, the flotation transfer technique, the technique of fine dynamic and mobile laminar flow.

The second family of techniques of depositing particles in a compact film is the group formed by electrophoretic deposition, horizontal deposition by evaporation of a film, deposition by evaporating of a bath, deposition by vertical removal of an immersed substrate, and horizontal deposition by forced removal of the contact line.

The masking balls deposited are preferably made of $SiO_2$, although they may also be of a different nature so long as the main parameters of the etching are satisfied.

The parameters applied in order to carry out the depositions of balls when the method used is the method of transferring a monofilm of compacted particles onto a carrier liquid in movement, and when a textured surface of FIGS. 1 to 3 is manufactured, are described below in Table 1 below.

TABLE 1

| Parameters | Value applied | Min | Max |
|---|---|---|---|
| Diameter of the silica particles | 1 μm or 540 nm | 0.01 μm | 10 μm |
| Solvent | Butanol | | |
| Concentration | 35 g/l | 10 g/l | 50 g/l |
| Carrier liquid | Deionized water | | |
| Flow rate of the carrier liquid | 400 ml/min | 100 ml/min | 1000 ml/min |
| Rate of injection of the particles | 0.5 ml/min | 0.01 l/min | 3 ml/min |
| Drawing speed | 1 cm/min | 0.1 cm/min | 10 cm/min |

According to FIGS. 4 and 5, the dry etching method carried out in the fourth step 210 is, for example, reactive ion etching using a gas mixture of sulfur hexafluoride ($SF_6$) and dioxygen ($O_2$) in a ratio of 5/3. Other gases capable of etching the material selectively with respect to the balls may also be used.

In general, and independently of the dry etching method used, the etching rate Vsub of the substrate material and the etching rate Vpar of the particles are more than 50 nm/m, and the etching selectivity Sg, defined as the ratio of the etching rate of the substrate material to the etching rate of the particles, lies between 1 and 10.

When a textured surface of FIGS. 1 to 3 is being manufactured, the dry etching method described below may be used. This etching method employs:

silica balls $SiO_2$ measuring 530 nm or 1 µm, which are deposited colloidally with flotation of a compact monolayer of balls on a solvent and transfer onto the substrate to be textured,
  a reactor of the "reactive ion etching" RIE type,
  a generator with a frequency of 13.56 GHz,
  a gas mixture of $SF_6$ and $O_2$,
  flow rates of 5 sccm for $SF_6$ and 3 sccm for $O_2$,
  a pressure off 25 mTorr,
  a power of 0.25 $W/cm^2$ (20 W on a heating zone with a diameter of 10 cm), and
  a substrate temperature equal to 50° C.

The time of the etching method depends on the type of material used for the substrate and on the diameter of the balls used.

When balls having a diameter of 530 nm are used, the etching method time is equal to 600 s for a substrate material of the first type SiC, and 480 s for a substrate material of the second type SiSiC.

In the case of a silica ball having a diameter of 1 micron, the time of the etching method is multiplied by 2 compared with balls having a diameter of 530 nm, i.e. for example 1200 s for a substrate of the first type SiC.

The above-defined conditions of the etching methods are conditions which are optimized in order to obtain the selectivity (ratio of the etching rates between the mask of silica balls and the material to be etched, of the SiC or SiSiC type) making it possible to achieve a form factor of the microstructures, defined as the ratio of their height to their width, of about 1, that is to say lying between 0.3 and 5.

It should be noted that, when the manufacturing method uses a substrate made of monocrystalline silicon carbide SiC, it is necessary to add an opaque material to the said substrate on the face opposite the structured exposure face in order to produce a good infrared IR emitter, this being because of the infrared transparency of monocrystalline silicon carbide SiC.

The structurings obtained by the manufacturing methods described above may be applied to thick solid materials, and also to layers of the silicon carbide type which are created on substrates of different material.

Other etching chemistries may be used, in particular fluorine-based chemistries.

Figure 6:
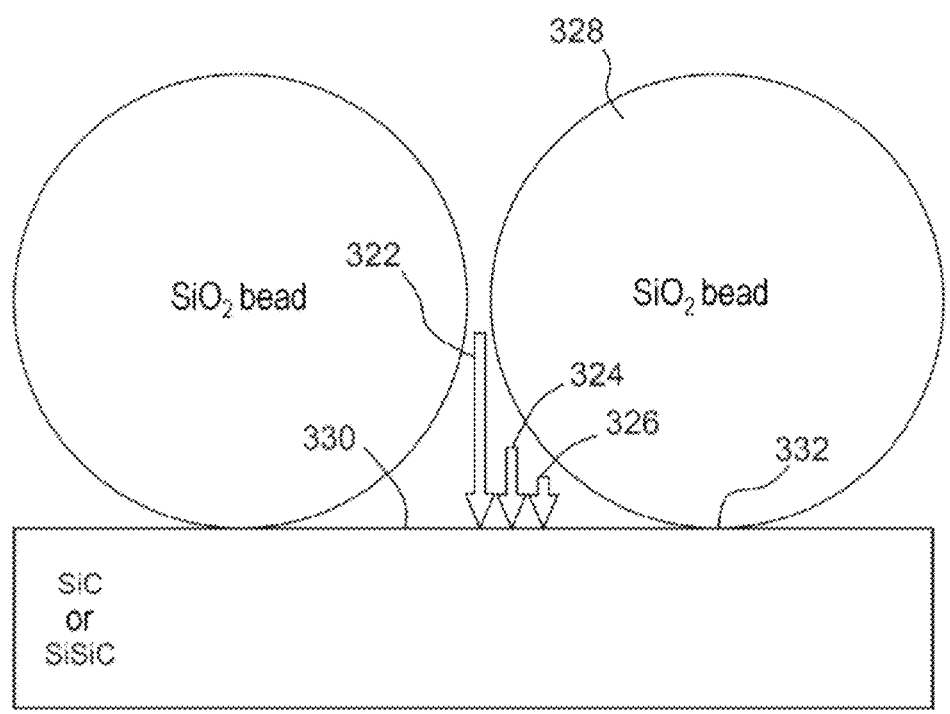
FIG. 6 is a view of the main mechanism of the dry etching employed in the manufacturing methods of FIGS. 1 to 3.

In FIG. 6, a dry etching mechanism known as "ion bombardment" is used in the manufacturing methods of FIGS. 4 and 5.

According to this mechanism represented by the arrows 322, 324, 326, the ions coming from the $SF_6$ plasma frontally attack with little selectivity, and anisotropically, the surface of the substrate which is accessible through the passage interstices existing between the masking balls. The effectiveness of the attack is commensurately higher when the access to the surface of the material through the covering of balls is easier. In FIG. 6, the lengths of attack arrows 322, 324, 326, which are proportional to the intensity and the effectiveness of the attack by ion bombardment, decrease starting from an "open" surface point 330 of the substrate in the direction of a contact point 332 of the masking ball 328. In connection with this, the etching by ion bombardment of the surface of the substrate is accompanied by etching of the mask by ion erosion of the surface of the masking balls, the erosion of the surface of the masking balls having an effect on the etching rate. This mechanism, referred to as "ion bombardment", gives rise to the shape of the microstructures described in FIGS. 1 to 3.

Thus, the method of FIGS. 4 and 5 makes it possible to obtain structurings as described in FIGS. 1 to 3.

The advantages of the manufacturing method according to the first and second embodiments of FIGS. 4 and 5 are as follows:

conduct of the manufacture of the surfaces according to the invention at low temperature, that is to say at a temperature of less than 100° C., without high-temperature heat treatment, which may facilitate the integration of this material into a device, for example a gas sensor, incorporating an IR source or emitter with a resistive heating element, a cavity containing a gas to be tested, and an IR radiation sensor or detector,
  adaptation of the IR emission as a function of the geometry of the structuring of the surface, because of the fact that the emission spectrum depends on the shape and the size of the microstructures,
  high resistance to thermal oxidation, and therefore stability over time of the performance of the emitting surface, which needs to be heated in order to emit its flux of infrared IR radiation.

Figure 7:
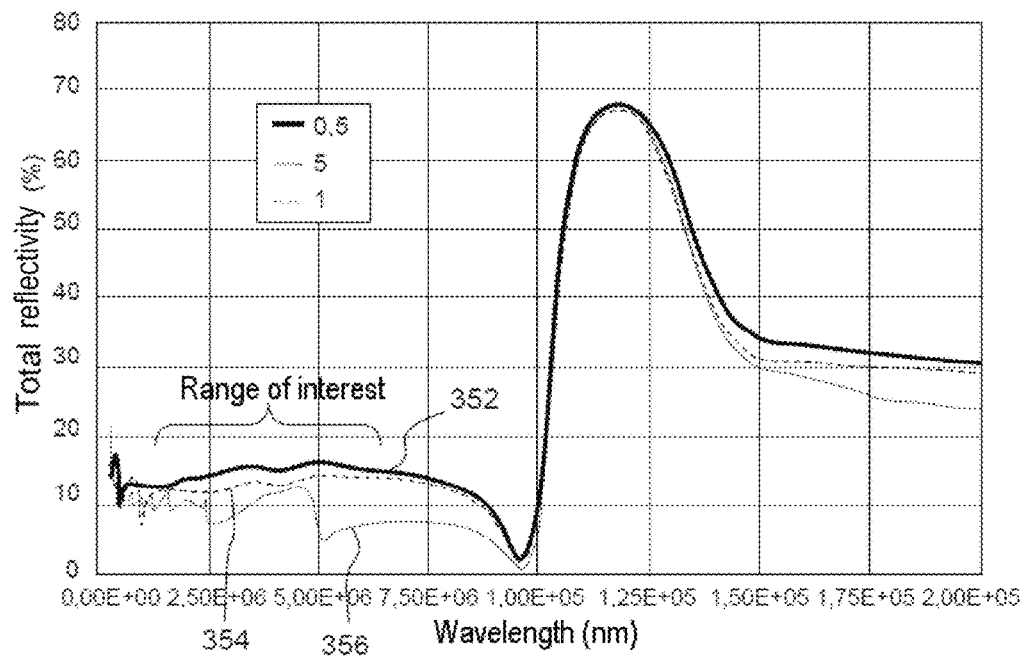
FIG. 7 is a view of simulated reflectivity spectra of various structurings of IR emission surfaces according to the invention, illustrating the effect of the size of the structures on the reflectivity.

According to FIG. 7, and by way of example, various simulated spectra of reflectivity are plotted for various structurings of the selective emission surfaces. Here, in this simulation, the microstructures are assumed to be hemispheres connected in a bidimensional network with a hexagonal close-packed cell. Here, a first spectrum 352, a second spectrum 354 and a third spectrum 356 correspond respectively to sizes of the microstructures, here the diameters of the hemispheres, equal to 0.5, 1 and 5 microns.

It appears that the effect of increasing the size of the microstructures in the range of from 1 to 5 microns is to reduce the reflectivity, and therefore to increase the emission for an opaque material.

Thus, the optical performance in terms of increasing the absorption and the emission at predetermined infrared IR wavelengths are optimized by adapting the size of the microstructures made of silicon carbide (SiC or SiSiC).

For example, by increasing the diameter of the microstructures to 1 micron, the absorption and the emission of the selective emission surface are maximized in the range of wavelengths from 4 to 4.5 microns for detecting carbon dioxide $CO_2$.

Figure 8:
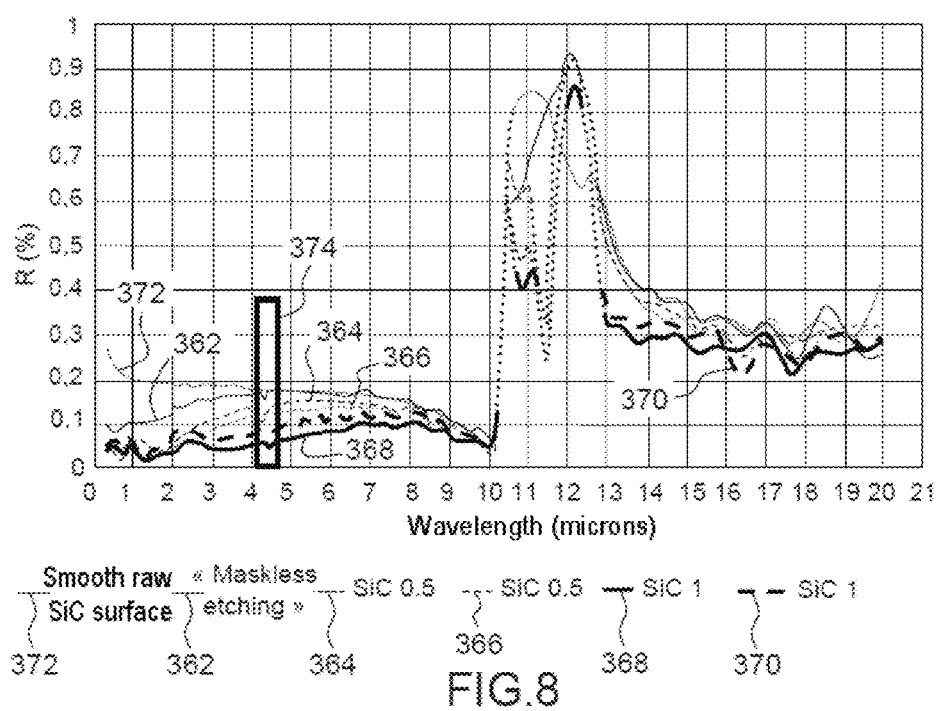
FIG. 8 is a view of reflectivity spectra measured in the visible and infrared ranges for various structurings of a surface according to the invention made of silicon carbide SiC, in comparison with the measured spectrum of an unstructured or smooth surface of raw silicon carbide SiC, the spectra being measured before ageing in an oxidizing environment at high temperature.

According to FIG. 8, reflectivity spectra 362, 364, 366, 368, 370 measured in the visible and infrared ranges for various structurings of a selective surface according to the invention made of silicon carbide SiC are compared with a first measured spectrum 372 of an unstructured or smooth raw surface of silicon carbide SiC, the spectra being measured before any ageing, particularly in an oxidizing environment at high temperature.

Spectrum 362 corresponds to microstructures of the "maskless etching" type (i.e. carried out without a mask of balls) of small sizes, less than 200 nm, which affect above all the visible range for wavelengths of between 300 and 800 nm. Spectra 364, 366 correspond to microstructures referred to as "SiC 0.5", which have a characteristic size of 0.5 micron in the plane of the surface. They improve the absorption and therefore the emission in the visible and near infrared IR range of between 300 and 2500 nm. If the characteristic size of the microstructures is increased to 1 micron, the samples are then referred to as "SiC 1", and the corresponding spectra show that the range of reduction of reflectivity and improvement of emission is extended into the medium infrared IR, the latter being suitable for gas sensors, and has very good performance in the range of 4-4.5 microns, framed in FIG. 8 by a rectangle 374, which is useful for the detection of carbon dioxide $CO_2$.

A reflectivity reduction of from 20% to less than 5% is observed here in the range of 4-4.5 microns. This reflectivity reduction is associated with an increase in the IR emission because this material, here polycrystalline silicon carbide SiC obtained by hot pressing, is opaque when it has a sufficient thickness.

FIGS. 9 to 12 and 14 illustrate the resistance to oxidation of the selective infrared radiation emission surfaces.

Figure 9:
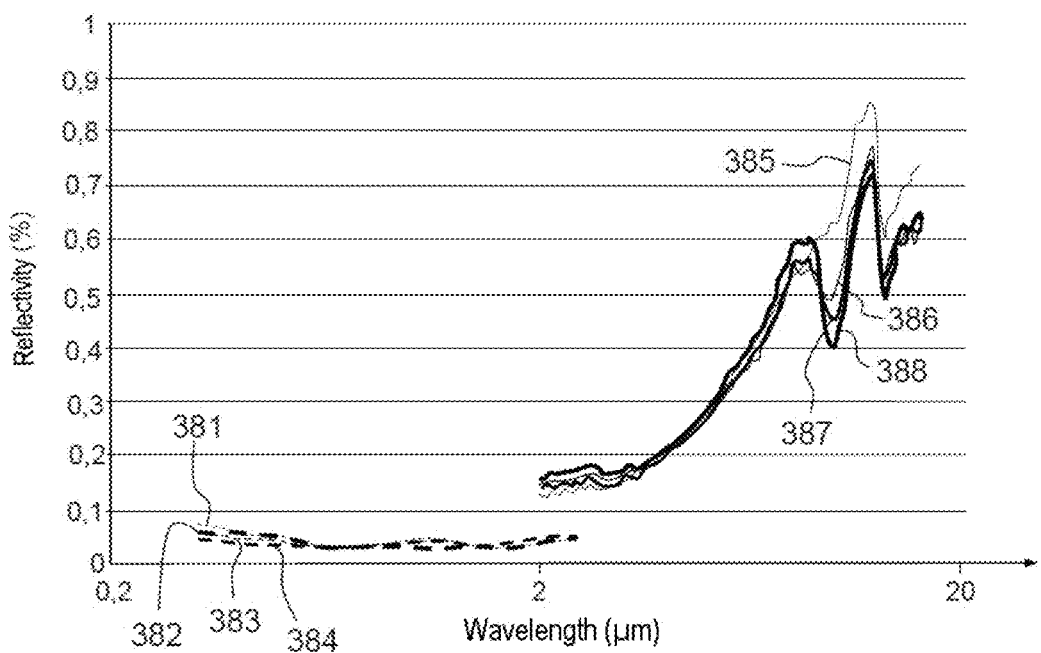
FIG. 9 is a view of reflectivity spectra measured in the visible and infrared ranges for the infrared radiation emission surface of the second embodiment of FIG. 3.

According to FIG. 9, reflectivity spectra 381, 382, 383, 384, 385, 386, 387, 388, measured in the visible and infrared ranges, of an infrared IR emitter made of enriched silicon carbide SiSiC, the surface of which is structured according to the second embodiment of FIG. 3, are illustrated. The spectra 381, 382, 383, 384 in the visible range, and respectively the spectra 385, 386, 387, 388, are measured at different respective times, 0 hours, 3 hours, 15 hours, 25 hours, during ageing in air at a temperature of 1000° C.

FIG. 9 confirms the integrity of the IR radiation emitters with a structured emission surface according to the invention for extremely high ageing temperatures of the order of 1000° C. in air, with spectra in the visible range 381, 382, 383, 384 and in the infrared range 385, 386, 387, 388 unchanged between zero and 25 hours.

Figure 10:
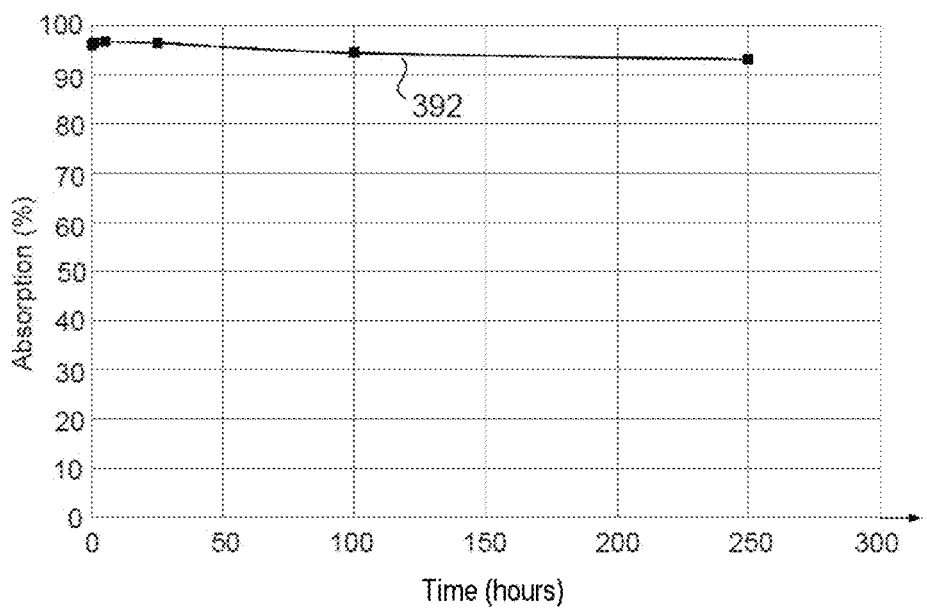
FIG. 10 is a view of the variation of the absorption of an infrared IR radiation emitter made of enriched silicon carbide SiSiC, the emission surface of the absorber being structured according to the second embodiment of FIG. 3 and exposed to air at a temperature of 1000° C.

FIG. 10 illustrates the time variation 392 of the measured solar absorption of an infrared radiation emitter made of enriched silicon carbide SiSiC, the exposed emission surface of which is structured according to the second embodiment of FIG. 3, the ageing having taken place at a temperature of 1000° in air. It should be noted that the absorption is equivalent to the emissivity for an opaque body. It appears that the solar absorption, and through it the parameter of reflectivity, remains substantially unchanged over time for extreme temperatures, and confirms the excellent performance of the structured emitters according to the invention in terms of lifetime.

These excellent lifetime properties are obtained by virtue of the intrinsic resistance of silicon carbide to oxidation, but also the particular geometrical shapes of structures produced according to the invention.

Figure 11:
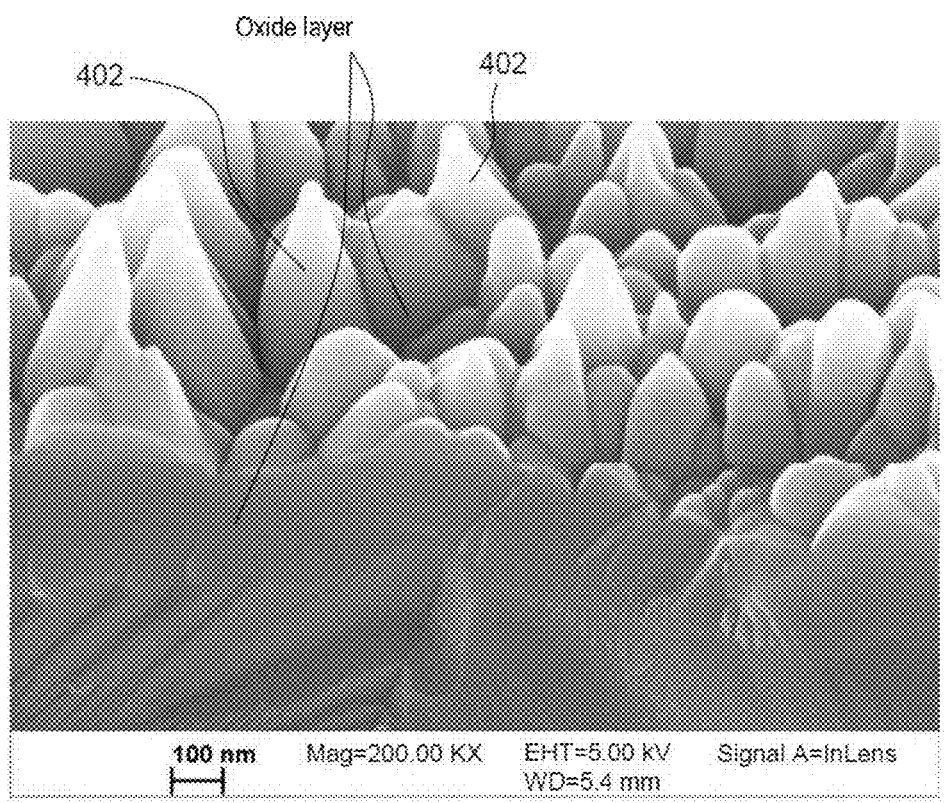
FIG. 11 is a scanning electron microscopy view of the technical effect of the undulating or irregular shape and the small size of the microstructures on the ageing performance of the microstructured surface in terms of modifications of the shape and size of the parasitic microstructures, the ageing in air being visualized after 250 hours at a constant temperature of 1000° C.

Specifically, as shown in FIG. 11, the broken or irregular shape and the small size of the microstructures 402, such as parasitic microstructures of the "maskless etching" type (diameter about 100-200 nm) or the microstructures representing the prior art (size less than or equal to two hundred nanometers), are clearly modified during ageing after 250 hours in air at a constant temperature of 1000° C., being fully oxidized with an oxide layer having a relatively large dimension.

Figure 12:
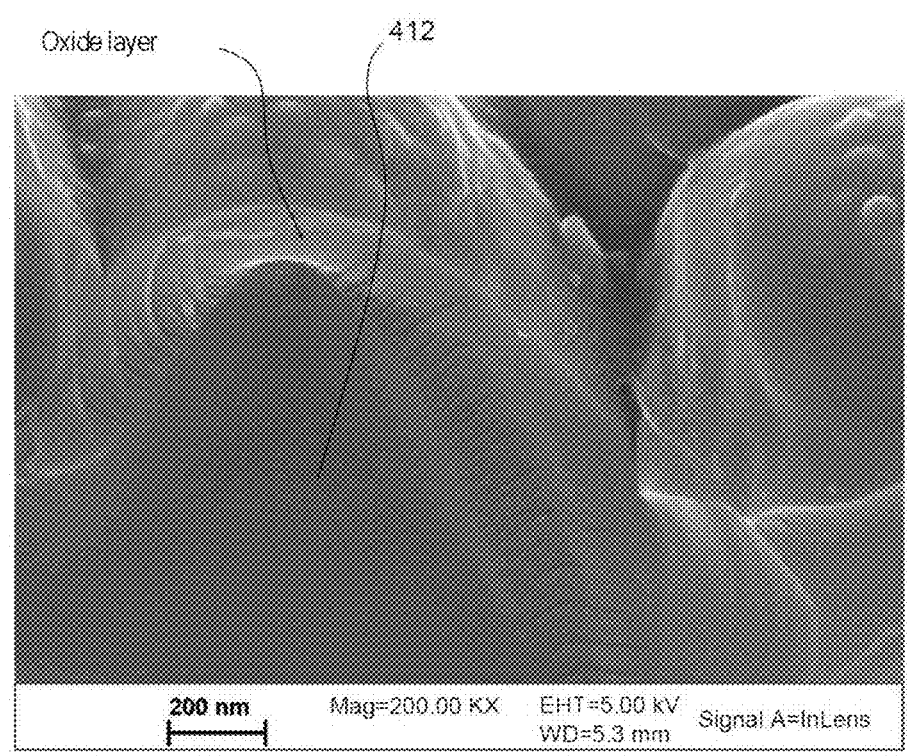
FIG. 12 is a scanning electron microscopy view of the technical effect of the regular shape and size of the microstructures of a surface according to the invention of FIGS. 1 to 3 on the ageing performance of the microstructured surface in terms of modifications of the shape and size of the parasitic microstructures, the ageing in air being visualized after 250 hours at a constant temperature of 1000° C.

Conversely, and as shown in FIG. 12, the regular shape (spherical, blunted cone, parabolic) and the relatively large size of the microstructures 412 of a surface according to the invention of FIGS. 1 to 3 allow the microstructures 412 to keep substantially the same shape and the same size while being slightly oxidized on the surface. Thus, the optical property of low reflectivity/high absorption is maintained under extreme conditions of temperature and oxidizing medium.

The preservation of the optical performance at 1000° C. ensures a long lifetime of the IR emission surfaces used in thermal emitters.

The optical property of low reflectivity/high absorption/high IR emission is therefore preserved under extreme conditions.

Figure 13A:
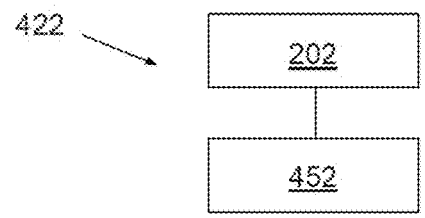
FIGS. 13A and 13B are flow charts of a third and a fourth embodiment of a method for manufacturing a textured infrared radiation emission surface, employing an additional oxidation step.
Figure 13B:
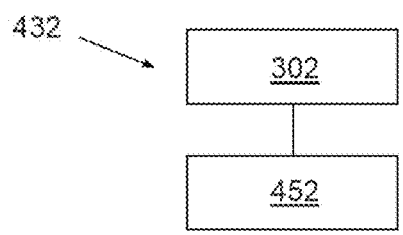

As a variant of the first and second embodiments of the manufacturing method and according to FIGS. 13A and 13B, third and fourth embodiments 422, 432 of a method for manufacturing a radiation emission surface according to the invention respectively comprise steps which are the same as those of the methods 202, 302 of FIGS. 4 and 5. The third and fourth manufacturing methods 422, 432 each comprise an additional step 452 of thermal oxidation at high temperature of the structured surface according to the invention based on silicon carbide. The additional step 452 is carried out at the end of the methods 422, 432, after the respective basic methods 202, 302.

The reflection minimum which is obtained in the band of 4-6 microns also makes it possible to maximize the thermal emission of an IR source manufactured with silicon carbide. The IR emission surfaces obtained by the third and fourth methods 422, 432 also have a long lifetime, and have optical properties which are stable during ageing. Nevertheless, the conduct of these third and fourth embodiments of the manufacturing method is more complex, and comprises a high-temperature step which may entail problems of integration in the final device.

Figure 14:
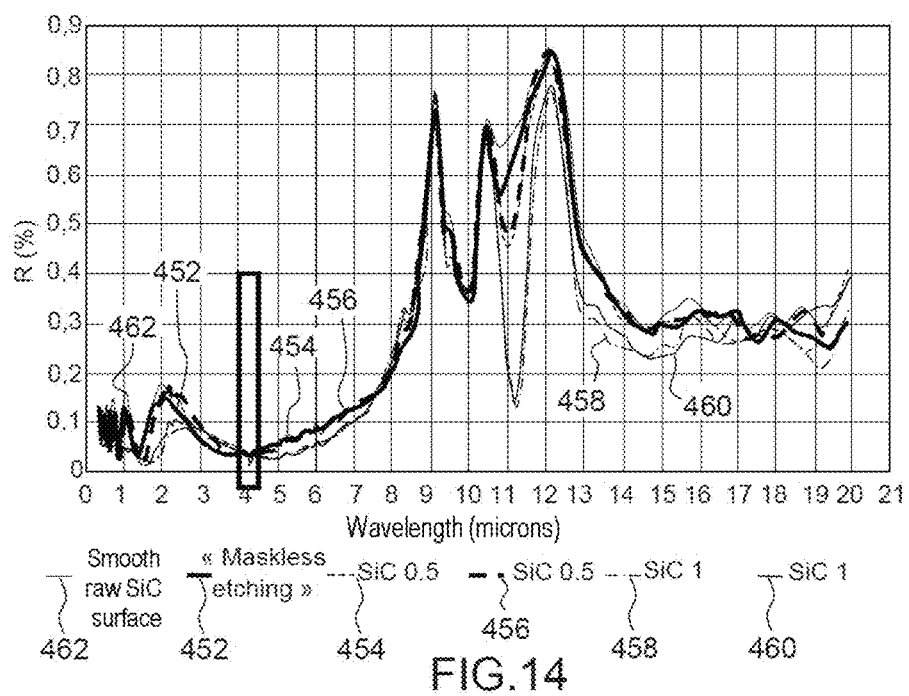
FIG. 14 is a view of reflectivity spectra measured in the visible and infrared ranges for various structurings of an IR emission surface according to the invention in comparison with the measured spectrum of an unstructured or smooth surface of silicon carbide SiC, the measurements taking place after a heat treatment in air at a temperature of 1200° C. for 100 hours.

According to FIG. 14, measured spectra 452, 454, 456, 458, 460, 462 of reflectivity in the visible and infrared ranges for various structurings of a selective IR emission surface according to the invention are compared with the measured spectrum of an unstructured or smooth surface of silicon carbide SiC, all the measurements taking place after a heat treatment in air at a temperature of 1200° C. for 100 hours.

The measured spectra 454, 456, 458, 460 confirm that the structures according to the invention, produced according to the first and second embodiments of the manufacturing methods of FIGS. 3 and 4, are extremely stable and maintain a minimum reflectivity (maximum absorption/emission) even when partially oxidized.

The spectra 454, 456, 458, 460 measured before ageing of the structured selective surfaces, produced according to the third and fourth methods 422, 432, show a low reflectivity of the surfaces and therefore a high emission for an opaque body.

All the measured spectra 452, 456, 458, 460, 462 have similar optical performances of low reflectivity/high absorption/high IR emission.

According to FIG. 14 and spectrum 462, it appears that the creation of a surface oxide layer on a sample having an unstructured or smooth raw surface causes a reduction of the reflectivity and maximization of the emission for an opaque body, at wavelengths close to 4 microns, which are suitable for producing an IR infrared source for the detection of carbon dioxide $CO_2$. Thus, a method for manufacturing a selective infrared IR radiation emission surface, carried out in a single step by thermal oxidation of a smooth surface based on silicon carbide at 1200° C. for 100 h, or at a higher temperature, that is to say a temperature of between 1400 and 1600° C., for a shorter time, constitutes an alternative to the four embodiments of the manufacturing method according to the invention of FIGS. 4, 5, 6A and 6B. This alternative is advantageous in terms of simplicity of carrying out the method.

Nevertheless, the drawback of this alternative method is a long execution time of the method and/or a very high temperature, which may be incompatible with certain integrations combining materials that do not withstand this temperature. According to this alternative, the oxide has a stoichiometry lying between those of SiO and $SiO_2$, with a typical thickness of the order of from 100 to 1000 nm.

The possible applications of the above-described infrared radiation emission surfaces according to the invention mainly relate to the field of gas sensors. For such sensors, a good capacity to emit infrared IR radiation is desired with, at the same time, good resistance to temperature and/or in particular to air, in order to avoid placing the entire structure of the sensor in a vacuum, which is expensive. The above-described means for structuring the basic surface of silicon carbide make it possible to maximize the infrared IR absorption and emission of the surface and, at the same time, to provide excellent resistance to a high temperature in a corrosive medium, such as air, in terms of maintaining its optical properties.

These emission surfaces make it possible to improve the performance of infrared IR sources by increasing the infrared IR flux emitted at a given temperature, and consequently the efficiency calculated as being the ratio between the infrared IR power emitted and the power dedicated to heating the source, generally carried out by the Joule effect.

Furthermore, these emission surfaces allow operation in air, and therefore simplify the integration of the source and reduce the cost of the sensor. Lastly, these highly oxidation-resistant surfaces make it possible to increase the reliability and the lifetime of the source and of the sensor.

An IR radiation emitter using such emission surfaces may be employed as an IR heating source, as an emitter of infrared IR radiation to a thermophotovoltaic cell, or as an infrared IR source for sensors. In all cases, its advantage is its resistance to oxidation at high temperatures and therefore the possibility of using it in air, or in a weak vacuum.

The optical properties of these emission surfaces allow them to emit infrared (IR) radiation with a spectrum different from that of the original material by virtue of the functionalization/structuring of the surface.

The increase in the radiative intensity emitted for a given temperature takes place in a wavelength range that depends on the structure produced.

In all cases, besides the high IR emission when it is heated, the advantage of this surface based on silicon carbide, structured with particular dimensions, is its high resistance to oxidation at high temperature and therefore the stability of its performance over time.

The invention claimed is:

1. An infrared IR radiation emission surface with high thermal emissivity for an infrared radiation emitter, comprising
    a substrate consisting of a thickness of a first material based on silicon carbide SiC and having a planar or curved face, and
    a set of texturing microstructures covering the face,
    the said infrared IR radiation emission surface wherein
    each microstructure is formed by a single protuberance made of the first material, which is arranged on and integrally with the substrate, and
    the microstructures have the same shape and the same dimensions, and are distributed over the face of the substrate in a bidimensional periodic pattern, and
    the shape of each microstructure is smooth and regular, while having a single apex and a radius of curvature which varies continuously from the apex of the microstructure to the face of the substrate.

2. The infrared IR radiation emission surface according to claim 1, wherein the first material based on silicon carbide is
    monocrystalline or polycrystalline silicon carbide SiC, or
    monocrystalline or polycrystalline silicon carbide SiC enriched with silicon Si in the form of silicon islands Si.

3. The infrared IR radiation emission surface according to claim 1, wherein
    the surface of each microstructure has an apex lying in a central region with the same maximum height h, corresponding to the height of the microstructure, and the said surface of the microstructure decreases from the apex towards an edge of a base of the microstructure.

4. The infrared IR radiation emission surface according to claim 1, wherein
    the surface of each microstructure comprises a part of the surface of a spherical, elliptical or parabolic cap.

5. The infrared IR radiation emission surface according to claim 1, wherein
    each microstructure substantially has the same base diameter d, which is greater than or equal to 0.5 µm and less than or equal to 7 µm, preferably lying between 1 µm and 5 µm, and
    the same maximum height h of each microstructure is greater than or equal to 0.5 times the base diameter d and less than or equal to 10 times the base diameter d.

6. The infrared IR radiation emission surface according to claim 1, wherein
    the radius of curvature p of each microstructure is greater than or equal to 0.1 µm and distributed around a central radius of curvature value of between 0.5 µm and 5 µm.

7. The infrared IR radiation emission surface according to claim 1, wherein
    the arrangement of the microstructures on the exposure face of the substrate is carried out in the form of tiling of elementary networks of microstructures,
    the elementary networks having the same cell pattern among the group formed by hexagonal cells, square cells and triangular cells, and being characterized by a degree of compactness of the microstructures with respect to one another.

8. The infrared IR radiation emission surface according to claim 1, wherein
    the surface of each microstructure and the face of the substrate are oxidized.

9. The infrared IR radiation emitter comprising an infrared IR radiation emission surface as defined in claim 1.

10. The infrared IR radiation emitter according to claim 9, among the group of devices formed by
    infrared heating sources,
    emitters of infrared IR to a thermophotovoltaic cell for converting heat into electricity, and
    emitters of an infrared IR source for gas sensors.

11. A method for manufacturing an infrared IR radiation emission surface capable of operating at high temperatures, the said manufacturing method comprising
    a first step consisting in providing a substrate, consisting of a thickness of a first material based on silicon carbide SiC and having a planar or curved exposure face,
    further comprising
    a second step, carried out following the first step, consisting in producing an ensemble of texturing microstructures covering the face,
    each microstructure being formed by a single protuberance made of the first material and arranged on and integrally with the substrate,
    the microstructures having the same shape and the same dimensions, and being distributed over the face of the substrate in a bidimensional periodic pattern, and the shape of each microstructure being smooth and regular, while having a single apex and a radius of curvature which varies continuously from the apex to the face.

12. The method for manufacturing an infrared IR radiation emission surface according to claim 11, wherein
the first step consists:
either in providing monocrystalline or polycrystalline silicon carbide SiC, or
in providing monocrystalline or polycrystalline silicon carbide SiC enriched with silicon in the form of silicon islands Si.

13. The method for manufacturing an infrared IR radiation emission surface according to claim 11, wherein
the first step consists:
either in isostatically compressing a silicon carbide SIC powder, or
in growing polycrystalline silicon carbide SIC, or
in growing monocrystalline silicon carbide SIC, or
in infiltrating silicon Si at high temperature into a porous carbon-containing matrix.

14. The method for manufacturing an infrared IR radiation emission surface according to claim 11, wherein
the second step comprises the successive steps consisting in
in a third step, depositing a compact monolayer of particles of a second material on the surface of the substrate, and
in a fourth step, etching the substrate by a dry etching method on the exposure face side through interstices existing between the particles,
the second material being included in the group formed by silica ($SiO_2$), polystyrene (PS) or any other colloidal material in the form of balls with the required dimension.

15. The method for manufacturing an infrared IR radiation emission surface according to claim 14, wherein
reduction of the size and the shape of the particles by dry etching is carried out,
either in a fifth step carried out during the fourth step at the same time as the dry etching of the substrate,
or in a sixth step interposed between the third step and the fourth step.

16. The method for manufacturing an infrared IR radiation emission surface according to claim 14, wherein
the deposition of the compact film of particles carried out during the third step is performed
either by a deposition technique involving an air/liquid interface ordering the particles, among the group formed by the Langmuir-Blodgett technique, the Langmuir-Shaefer technique, the surface vortex method, the flotation transfer technique, the technique of fine dynamic and mobile laminar flow,
or by a deposition technique involving only particles in colloidal solution, among the group formed by electrophoretic deposition, horizontal deposition by evaporation of a film, deposition by evaporating of a bath, deposition by vertical removal of an immersed substrate, and horizontal deposition by forced removal of the contact line.

17. The method for manufacturing an infrared IR radiation emission surface according to claim 14, wherein
the dry etching method carried out in the fourth step is reactive ion etching using a gas mixture of sulfur hexafluoride ($SF_6$) and dioxygen ($O_2$) in a ratio of 5/3.

18. The method for manufacturing an infrared IR radiation emission surface according to claim 17, wherein
the etching rate Vsub of the substrate material and the etching rate Vpar of the particles, the etching selectivity Sg, defined as the ratio of the etching rate of the substrate to the etching rate of the particles, and the etching time are regulated so as to consume all of the particles and avoid the creation of sharp edges on the surface of the substrate.

19. The method for manufacturing an infrared IR radiation emission surface according to claim 14, comprising a seventh step for removing the particles, which is carried out after the fourth step.

20. The method for manufacturing an infrared IR radiation emission surface according to claim 14, comprising an eighth step of oxidizing the surface of the microstructures and the face of the substrate.

* * * * *